United States Patent [19]
Wright

[11] Patent Number: 4,632,160
[45] Date of Patent: Dec. 30, 1986

[54] MOULDING ROUTING APPARATUS

[76] Inventor: M. Bosley Wright, 2501 Greenspring Valley Rd., Owings Mills, Md. 21117

[21] Appl. No.: 719,770

[22] Filed: Apr. 4, 1985

[51] Int. Cl.[4] .............................................. B27C 5/00
[52] U.S. Cl. ................................ 144/136 R; 144/2 R; 144/134 R; 144/371; 409/125; 409/182
[58] Field of Search ............... 409/125, 182; 144/2 R, 144/134 R, 136 R, 371

[56] References Cited

U.S. PATENT DOCUMENTS

| | | |
|---|---|---|
| 472,675 | 4/1892 | Linham . |
| 1,316,959 | 9/1919 | Keiser . |
| 1,409,258 | 3/1922 | Stenger . |
| 2,202,251 | 5/1940 | Gille . |
| 3,643,713 | 2/1972 | Massetani ......................... 144/136 R |
| 4,265,282 | 5/1981 | Lenz . |
| 4,405,255 | 9/1983 | Wallace . |

FOREIGN PATENT DOCUMENTS 291520 7/1971 Austria .

OTHER PUBLICATIONS

Ser. No. 646,440, Robert S. Wallace.
Ser. No. 535,784, Robert S. Wallace.

Primary Examiner—W. D. Bray
Attorney, Agent, or Firm—William W. Haefliger

[57] ABSTRACT

Apparatus for cutting grooves in moulding members adapted to have their ends joined in L-shaped assembly by an L-shaped bracket, the apparatus comprising:
(a) a first base, and a first guide surface on the base to engage the back side of the moulding thereby to position the moulding directionally laterally, and to extend directionally longitudinally,
(b) a first stop to engage and position the mitered end of the moulding, thereby to position the moulding longitudinally,
(c) clamp means movable to engage the positioned moulding and retain the moulding on the base,
(d) a first router and a rotary drive therefor, the router projecting into lapping relation with said mitered end of the moulding,
(e) means to displace the first rotating router relative to the base to directionally sidewardly engage and penetrate the mitered end of the moulding, thereby to produce said groove, the router thereafter being sidewardly removable from said groove,
(f) and means to adjustably position the base, laterally, thereby to position the mitered end of the moulding relative to the router.

22 Claims, 14 Drawing Figures

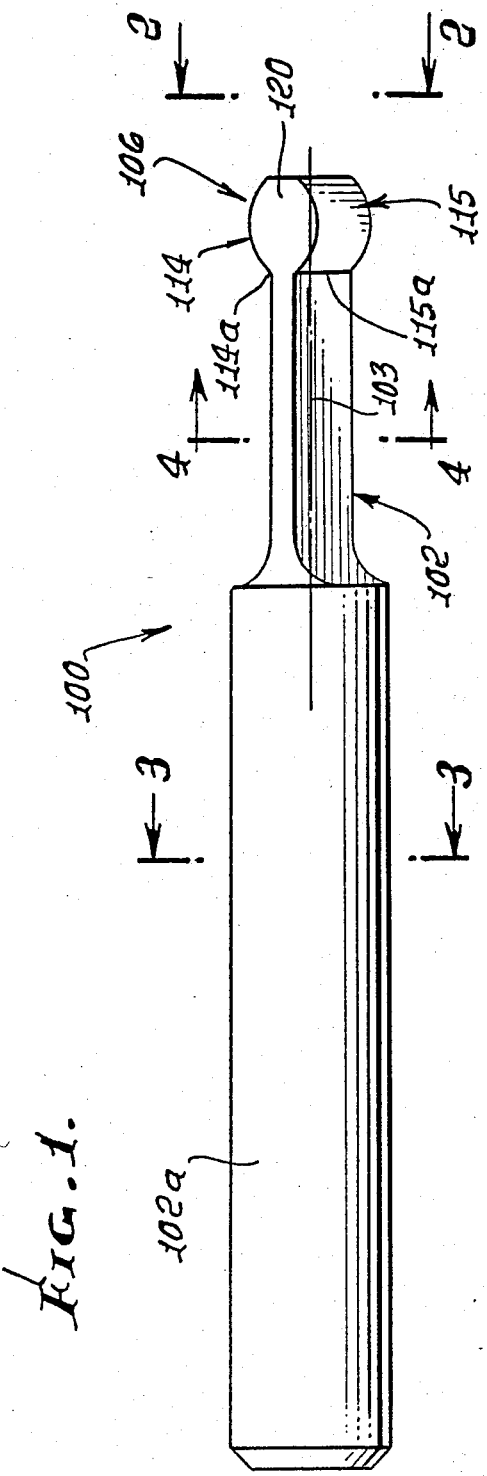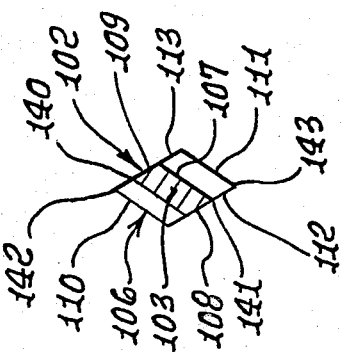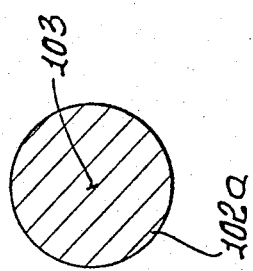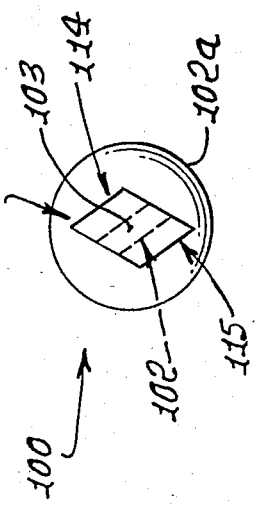

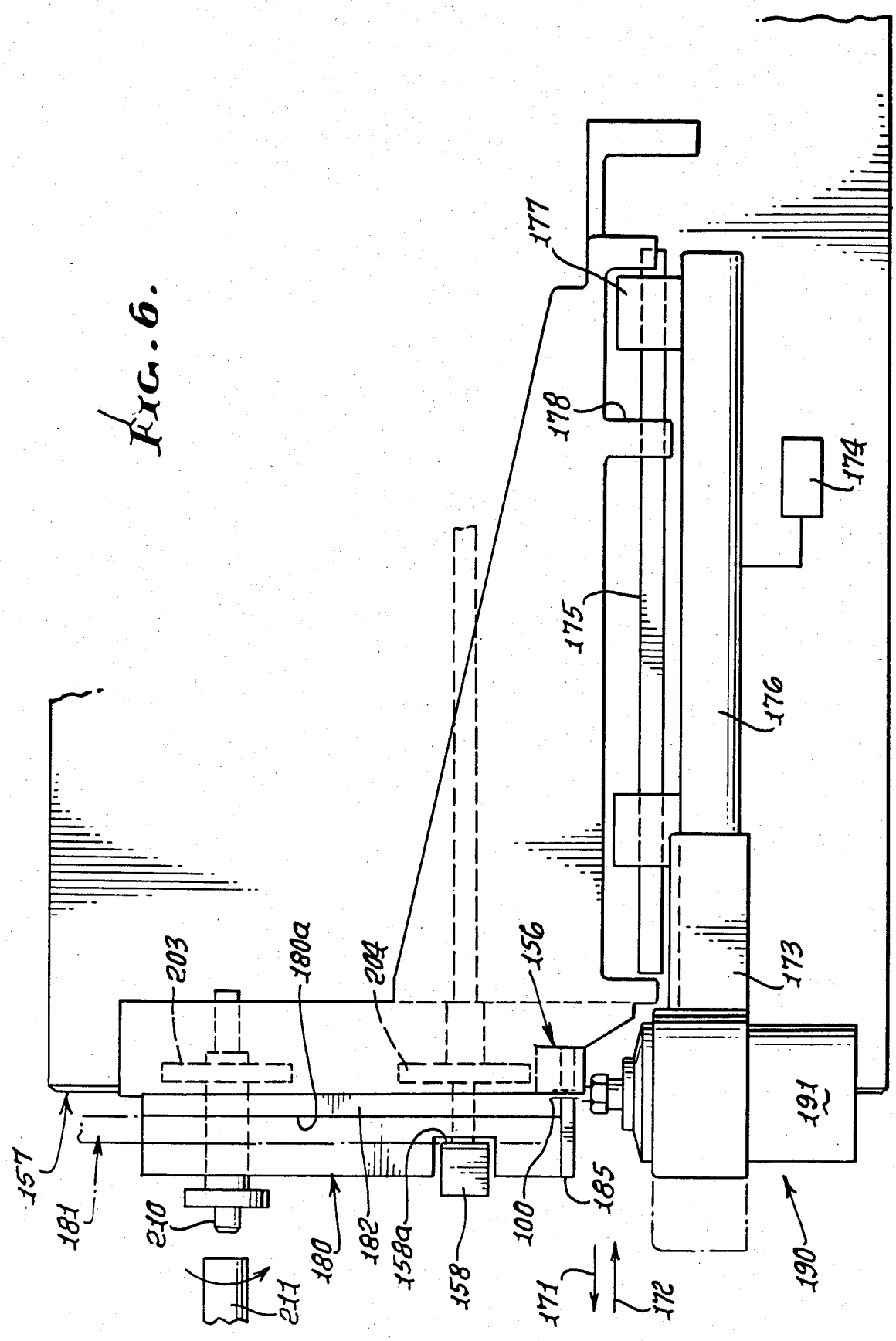

MOULDING ROUTING APPARATUS

BACKGROUND OF THE INVENTION

This application is related to prior applications Ser. Nos. 535,784, and 646,440.

This invention relates generally to production of grooves in mitred ends of mouldings or frame parts, and to receive corner brackets for holding such frame parts in assembled condition. More particularly, it concerns apparatus to produce recesses or grooves in frame parts, which will receive a bracket to lock to such parts.

There is a continuing need for simple, effective, low cost and easily inserted means to to hold frame parts in corner assembled condition. The prior use of staples for this purpose is objectionable due to need for a staple gun and lack of staple strength sufficient to hold the frame parts together, against relative bending displacement.

Further, there is need for simple, rugged, and easily operated means to form the above described recesses in frame members, to receive L-shape brackets.

SUMMARY OF THE INVENTION

It is a major object of the invention to provide apparatus for cutting an insert groove in a longitudinally extending moulding having a back side and a mitred end, whereby one leg of an L-shaped bracket of the particular shape referred to may be received in that groove. Basically, the apparatus comprises:

(a) a first base, and a first guide surface on the base to engage the back side of the moulding thereby to position the moulding directionally laterally, and to extend directionally longitudinally, (b) a first stop to engage and position the mitred end of the moulding, thereby to position the moulding longitudinally, (c) clamp means movable to engage the positioned moulding and retain the moulding on the base, (d) a first router and a rotary drive therefor, the router projecting into lapping relation with said mitred end of the moulding, (e) means to displace the first rotating router relative to the base to directionally sidewardly engage and penetrate the mitred end of the moulding, thereby to produce said groove, the router thereafter sidewardly removable from said groove, (f) and means to adjustably position the base, laterally, thereby to position the mitred end of the moulding relative to the router.

It is a further object of the invention to provide:

(g) a second base and a second guide surface on the second base to engage the back side of a second moulding having a mitred end to be grooved, thereby to position the second moulding directionally laterally, and to extend longitudinally, (h) a second stop to engage and position the mitred end of the second moulding, thereby to position the moulding longitudinally, (i) said clamp means also movable to engage the positioned second moulding and retain it on the second base, (j) a second router and a rotary drive therefor, the second router projecting parallel to the first router and into lapping relation with the mitred end of the second moulding, (k) said e) means operable to also displace the second rotating router relative to the second base to sidewardly engage and penetrate the mitred end of the second moulding, thereby to produce said groove in the second moulding, the second router thereafter being sidewardly removable from said groove, (l) said (f) means operatively connected to both the first and second bases and also position the second base, laterally, thereby to position the mitred end of the second moulding relative to the rotating router.

It is a further object of the invention to provide means to simultaneously adjust the mouldings, laterally, to provide mirror image grooves therein; and to simultaneously form the grooves in the mouldings, for matching groove depth control.

These and other objects and advantages of the invention, as well as the details of an illustrative embodiment, will be more fully understood from the following specification and drawings, in which:

DRAWING DESCRIPTION

FIG. 1 is a side elevation showing a router useful with the invention;

FIG. 2 is an end view on lines 2—2 in FIG. 1;

Figure 5:
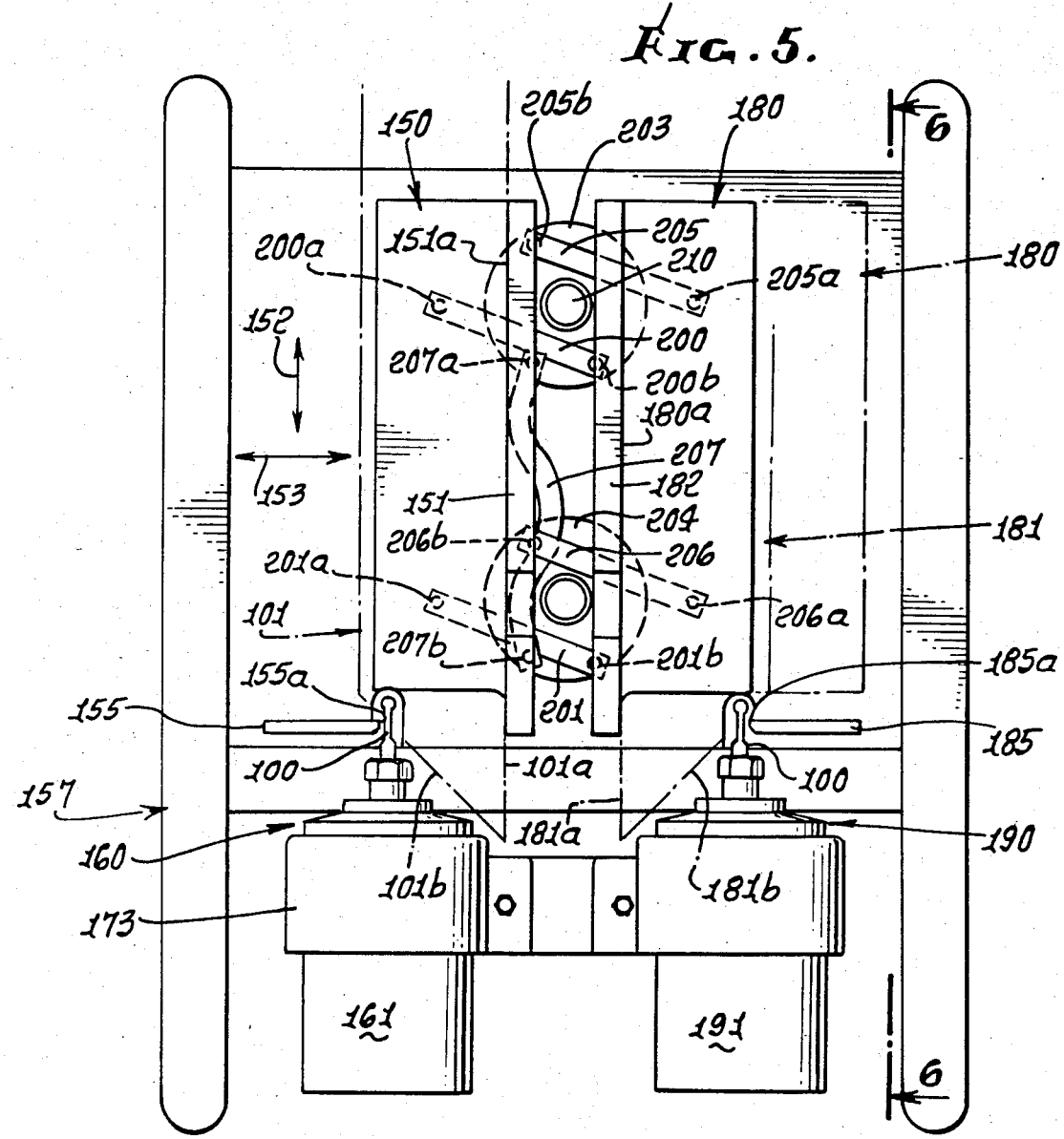
Figure 7:
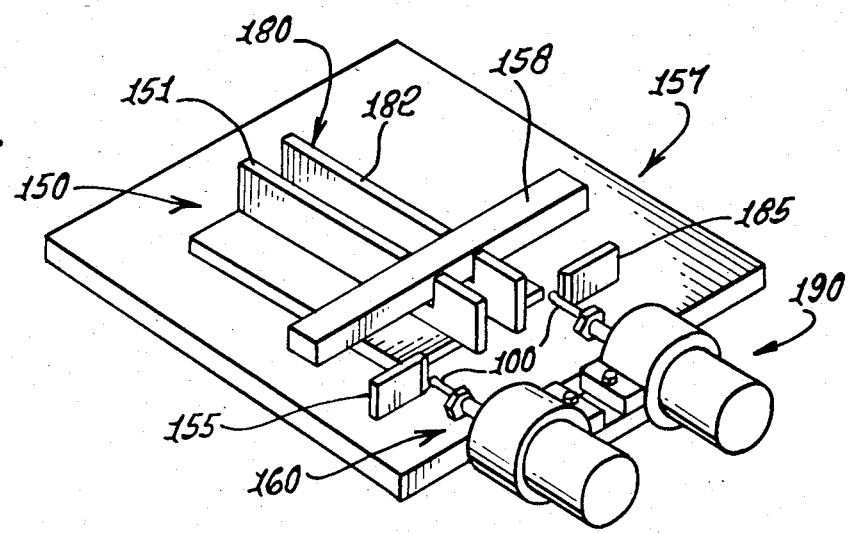
Figure 8:
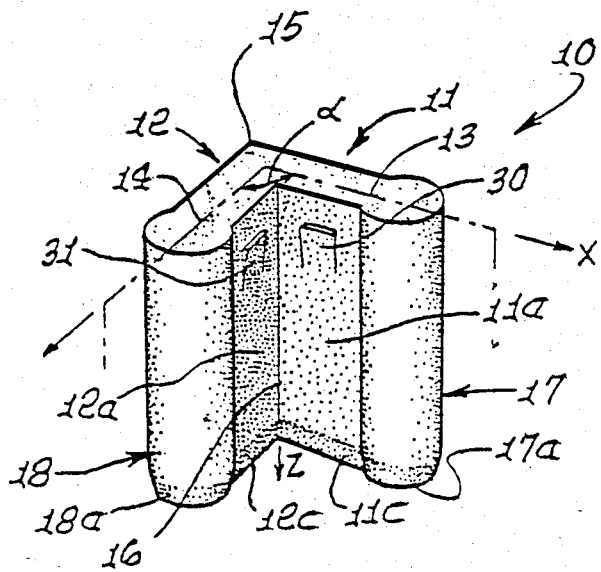
Figure 9:
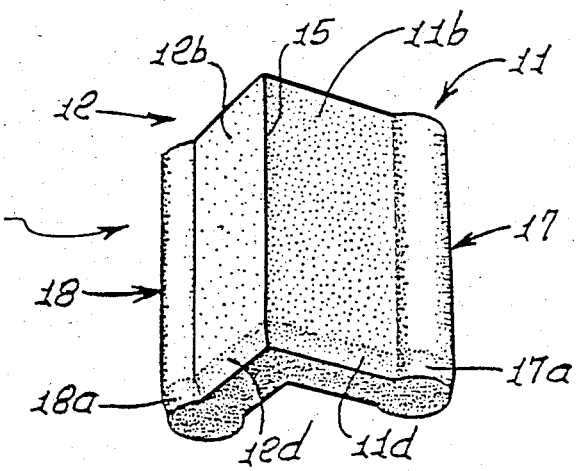
Figure 10:
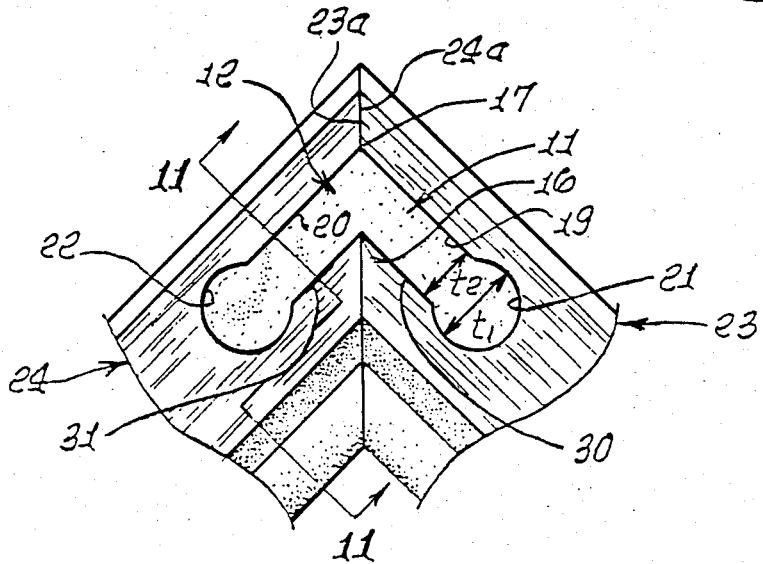
Figure 11:
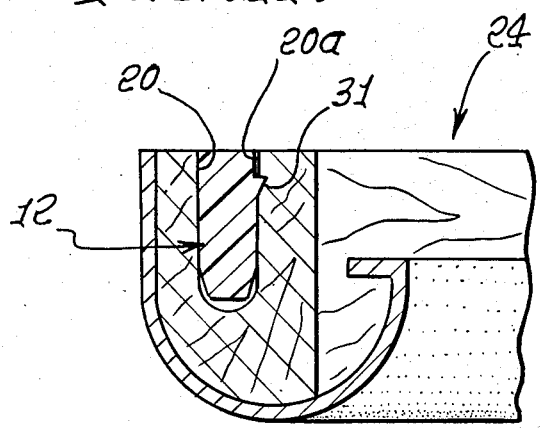
Figure 12:
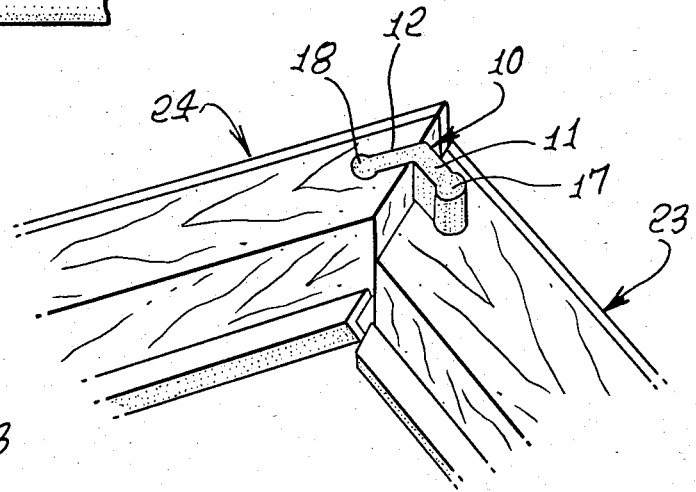
Figure 13:
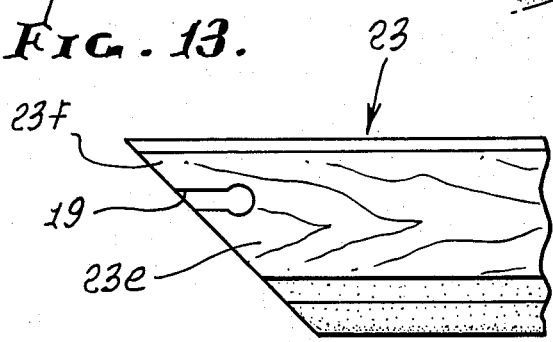
Figure 14:
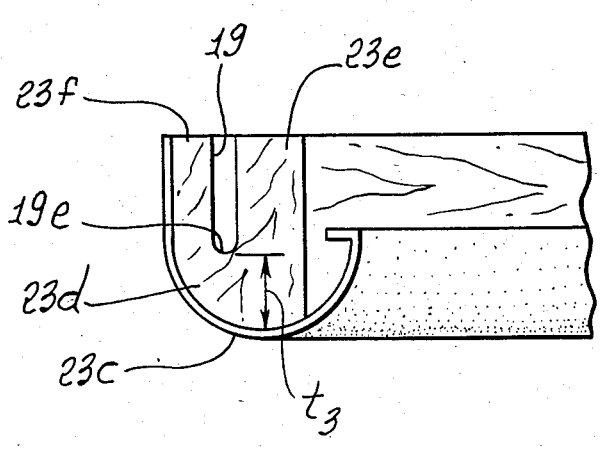

FIGS. 3 and 4 are sections taken on lines 3—3 and 4—4 of FIG. 1;

FIG. 5 is a top plan view showing apparatus to hold two frame members to be routed by two rotated routers;

FIG. 6 is a side view of the FIG. 5 apparatus and taken on lines 6—6 of FIG. 5;

FIG. 7 is a perspective view of the FIGS. 5 and 6 apparatus;

FIG. 8 is a perspective view of one side of a lock-up corner bracket;

FIG. 9 is a perspective view of the opposite side of the FIG. 8 bracket;

FIG. 10 is a plan view showing use of the FIG. 1 bracket in retaining frame parts in assembled conditions;

FIG. 11 is a section on lines 11—11 of FIG. 10;

FIG. 12 is a perspective view showing partial assembly of frame parts and the bracket of FIG. 8;

FIG. 13 is a top plan view of a frame part showing a recess cut thereby to receive one leg of the FIG. 8 bracket, and FIG. 14 is a side view of the frame part of FIG. 13.

DETAILED DESCRIPTION

In FIGS. 8 and 9 the illustrated lock-up corner brcket 10 is shown to include legs 11 and 12 that extend in planes 13 and 13 which define a corner angle $\alpha$. The latter is typically about 90°, but may vary somewhat from 90°, as for example between 85° and 95°. The leg 11 has opposite sides 11a and 11b which are longitudinally elongated in the Z direction indicated by arrow Z, and leg 12 has opposite sides 12a and 12b which are also elongated in the Z direction. Plane 13 is an X-Z plane, and plane 14 is an X-Y plane. Note inside and outside corners 15 and 15 of leg intersections.

The legs have terminal enlargements that are also elongated in parallel directions (parallel to the Z-direction) of forward insertion of the legs relatively into recesses formed in the frame parts, for retaining such parts in assembled relation or conditions. In the example, the enlargements 17 and 18 are integral with legs 11 and 12, respectively, and are columnar, the plane 13 and 13 bisecting the enlargements. Note that the columnar enlargements have lengths approximately equal to the Z-direction lengths of the legs, and they have generally cylindrical outer surfaces throughout such lengths.

Note also that the forwardmost end portions of the legs and enlargements are forwardly tapered (see tapers 11c and 11d, 12c, 17a and 18a) to assist in their intitial slide receptions into the corresponding recesses (leg and column) indicated at 19-22 in frame parts 23 and 24. Such slide reception is close in all such recesses, whereby the frame parts are rigidly positioned, as assembled, with 45° angled surfaces 23a and 24a held in face-to-face, sturdy interengagement. This is enhanced due to the columnar enlargements have cross-sectional dimensions "$t_1$" exceeding the thickness dimension "$t_2$" of the legs, as indicated in FIG. 10.

FIG. 12 shows an easy assembly mode (made possible by the invention) wherein the leg 12 and column 18 are first inserted into the recesses 20 and 22 in part 24; and then the leg 11 and column 17 are relatively inserted into the recesses 19 and 21 in part 23 causing faces 23a and 24a to slide against one another until the assembly is completed with the tops of the legs and columns flush with the surfaces 23a and 24a of the frame parts 23 and 24. The latter frame parts may be those of a picure frame, with a bracket 10 easily assembled to the frame parts at each of the four corners of the picture frame. This enables the frame parts to be incorporated in a small kit suitable for mailing, so that the ultimate user can quickly assemble the frame using the improved corner brackets.

An additional feature is the provision of a barb or barbs on one both legs of the bracket. See for example barbs 30 and 31 and legs 11 and 12, in FIG. 8. Such barbs integral with the bracket project outwardly from faces 11a and 12a, with forward taper, to compress the recess walls (see for example recess wall 20a in FIG. 11) during bracket insertion, and grip such walls to resist bracket removal from the recesses (i.e. to ensure that the parts 23 and 24 will remain assembled).

FIGS. 13 and 14 show details of a recess 19 prior to bracket insertion therein. Note that the recess terminates at point 19e, at a considerable spacing "$t_3$" from the bottom 23c of the frame part, so that the structural strength of the latter is not undesirably reduced (i.e. region 23d of the frame part remains unslotted so that sections 23e and 23f are not undesirably spread apart during bracket insertion). Sections 23e and 23f each have substantially constant width along their length, for maximum strength, as enabled by the insertion.

The frame parts may consist of wood or plastic material, and the bracket may typically consist of plastic material, as for example molded polypropylene.

As is clear from FIG. 9, the forwardmost tapered portions of the legs 11 and 12 and of the enlargements 17 and 18 terminate in a flat plane which is normal to the Z-direction of bracket insertion into the frame parts. See U.S. patent application of Wallace Ser. No. 535,784.

Referring now to FIGS. 1-4, the router 100 is constructed to cut an L-shape groove in elongated frame members (shown for example at 101 in tooling mounted position in FIGS. 5-7) so that such members may have their ends joined in L-shaped assembly by the L-shaped bracket 10 described above in FIGS. 8 to 14.

The metallic router 100 comprises and elongated cutter stem 102 having an axis 103 about which the stem is rotatable, as by driver 104 driven by motor 105. Driver 104 suitably mounts the router, as via an elongated and cylidrical stem extension 102a. The stem has substantially parallelogram cross sections in planes normal to the axis 103, and along the stem length.

The router also has a head 106 integral with and at the end of the stem, the head also having substantially parallelogram cross sections in planes normal to axis 103. Typically, the head cross sections are larger than the stem cross sections.

More specifically, and as shown, the head and stem parallelogram cross sections have parallel corresponding sides. As shown, the stem cross section sides 106-109 correspond to head cross section sides 110-113, sides 106 and 110 being parallel (but side 106 being closer to axis 103 than most of sides 110); sides 107 and 111 being parallel (but side 107 being closer to axis 103 than most of sides 111); sides 108 and 112 being parallel and in the same plane; and sides 109 and 113 being parallel and in the same plane. As a result, chips or cuttings fill into the spaces adjacent sides 106 and 107, and are pulled out when the cutter is sidewardly removed from the frame member. Also, sharp acute angled cutting edges are formed at 140, 141, 142 and 143.

Further, and as shown, the head typically, forms two generally outwardly convex surfaces indicated at 114 and 115, and coincident with cross section sides 110 and 111, respectively. Surfaces 114 and 115 merge with stem surfaces 106 and 107, as at locations 114a and 115a. The head also has a flat terminal 120 remote from the stem, and in a flat plane normal to axis 103.

Referring now to FIGS. 5-7, apparatus is shown for cutting insert grooves in longitudinally elongated mouldings 101, each having a backside 101a, and a mitred end 101b.

Such apparatus includes a first base or holder 150, and a first guide surface 151a on the base to engage the moulding backside, whereby the moulding is positioned to extend directionally longitudinally (see arrows 152) and is also positioned laterally (see arrows 153). Surface 151a is shown as defined by a longitudinally flange 151 integral with the base, and along side which the moulding extends.

A first stop is provided, as at edge 155a on part 155 to engage and position the mitred end face 101b of the moulding 101. Stop part 155 is supported at 156, on a frame 157. A clamp bar 158 is movable to engage the positioned moulding, to retain it on the base. Bar 158 may be suitably activated, as at 159, face 158a of the bar engaging the moulding.

A first router 100, of the type described above, is drive in rotation by drive 160, as includes a motor 161, and the router projects into lapping or overhanging relation with the mitred end of the moulding. See FIG. 5. Means is provided to displace the first rotating router relative to the base to directionally sidewardly engage and penetrate the mitred end of the moulding, thereby to produce the groove in the moulding. Such sideward direction is indicated by arrow 171 in FIG. 6. The router is thereafter removed from the groove, in direction of arrows 172. To this end, a bracket 173 is attached to the motor 166, and is movable in the direction of arrows 171 and 172 by an actuator indicated at 174. See also guide bar 175 for the actuator rod 176. A guage block 177 on rod 176 engages frame part 178 to limit movement of the rod 176 and router 100, in the direction of arrow 171, to thereby control the depth of the groove formed in the moulding.

A second base 180 with a second guide surface 180a on that base are also provided, to engage and position the backside 181a of a second moulding, indicated at 181, and in the same manner as moulding 150 is positioned. A flange 182 on base 180 may define the surface 180a. A second stop edge 185a on stop part 185 corresponds to stop 155, and engages and positions the mitred end face 181b of moulding 181. The clamp bar 158 also removably engages moulding 181 to retain it to its base, or "fence."

A second router 100, of above type, is driven in rotation by second drive 190, as includes a motor 191, and router 100 projects into overlapping relation with the mitred end of moulding 181, as shown. Bracket 173 is also attached to motor 191, so that both motors and routers advance in direction 171, and retract in direction 172, together, whereby both mouldings are grooved at the same time, and to the same depth.

Means is also provided to adjustably position one or both bases 150 and 180, laterally, thereby to position the mitred end or ends of the moulding 101 and 181 relative to the routers; so as to provide "mirror image" grooves therein (considering that the mitred ends 101b and 181b face in apparatus control direction 153). Such means advantageously includes pairs of parallelogram linkages, one pair of links 200 and 201 pivotally attached at 200a and 201a to one base 150 and at 200b and 201b to two rotors 203 and 204; and the other pins of locks 205 and 206 pivotally attached at 205a and 206a to the other base 180, and at 205b and 206b to the two rotors 203 and 204. Accordingly, rotation of the rotors displaces the bases laterally oppositely, simultaneously. A drive link 207 interconnects the two rotors, to which it is pivotally attached at 207a and 207b, and the two rotors are spaced apart longitudinally, whereby clockwise rotation of one rotor serves also to rotate the other rotor clockwise, to increasingly separate the bases, and vice versa. A rotor drive pin 210 is attached to one rotor 203, and projects above the level of the bases, to provide access to a drive tool indicated at 211. Accordingly, accurate adjustable positioning of the mouldings is achieved, laterally, for accurate and rapid mirror "image grooving" of their mitred ends, such mouldings then being rapidsly and tightly interconnectible by the bracket 10 as referred to above, and as shown in FIGS. 8–14.

FIG. 7 shows guideways for the bases 150 and 180.

I claim:

1. In apparatus for cutting an insert groove in a longitudinally elongated moulding having a backside and mitred end, the combination comprising:
   (a) a first base, and a first guide surface on the base to engage the back side of the moulding thereby to position the moulding directionally laterally,
   (b) a first stop to engage and position the mitred end of the moulding, thereby to position the moulding longitudinally,
   (c) clamp means movable to engage the positioned moulding and retain the moulding on the base,
   (d) a first router and a rotary drive therefore, the router projecting into lapping relation with said mitred end of the moulding,
   (e) means to displace the first router relative to the base to directionally sidewardly engage and penetrate the mitred end of the moulding, thereby to produce said groove,
   (f) and means to relatively adjustably position the base and drive, laterally, thereby to relatively position the mitred end of the moulding relative to the router.

2. The apparatus of claim 1 in which said sideward penetration of the router into the moulding is in a sideward direction normal to said lateral and longitudinal directions, and parallel to plane defined by the mitred end of the moulding.

3. The apparatus of claim 2 including means to adjustably position the base, laterally, and relative to the router.

4. The apparatus of claim 1 including a flange on the first base, and defining said first guide surface, said flange extending parallel to the router.

5. The apparatus of claim 1 including:
   (g) a second base and a second guide surface on the second base to engage the back side of a second moulding having a mitred end to be grooved, thereby to position the second moulding directionally laterally,
   (h) a second stop to engage and position the mitred end of the second moulding, thereby to position the moulding longitudinally,
   (i) said clamp means also movable to engage the positioned second moulding and retain it on the second base,
   (j) a second router and a rotary drive therefor, the second router projecting parallel to the first router and into lapping relation with the mitred end of the second moulding,
   (k) said means to displace the first router relative to the base operable to also displace the second router relative to the second base to sidewardly engage and penetrate the mitred end of the second moulding, thereby to produce said groove in the second moulding,
   (l) said means to adjustably position the base operatively connected to both the first and second bases and to also position the second base, laterally, thereby to position the mitred end of the second moulding relative to the second router.

6. The apparatus of claim 5 wherein said sideward penetration of the second router into the second moulding is in a sideward direction normal to said laterally and longitudinal direction, and parallel to a plane defined by the mitred end of the second router.

7. The apparatus of claim 6 including means to adjustably position both bases, laterally, and relative to the respective routers.

8. The apparatus of claim 5 including flanges on both bases and defining said guide surfaces, said flanges extending parallel to said routers.

9. The apparatus of claim 4 wherein said (e) means includes a bracket interconnecting first and second router drives and mounting said drives for simultaneous movement in said sideward direction.

10. The combination of claim 7 wherein said means to adjustably position the base includes pairs of parallelogram linkages, one pair pivotally attached to one base and to two rotors, and the other pair pivotally attached to the other base, and to said two rotors, respectively, whereby rotation of the rotors displaces the bases laterally oppositely, simultaneously.

11. The combination of claim 10 including a link interconnecting the rotors which are spaced apart longitudinally, whereby clockwise rotation of one rotor serves also to rotate the other rotor, clockwise.

12. The combination of claim 1 wherein said router has:
   (a) an elongated cutter stem having an axis about which the stem is rotatable, the stem having substantially parallelogram cross sections in planes normal to said axis, and (b) a cutter head at the end of the stem and integral therewith, the head also having substantially parallelogram cross sections in planes normal to said axis.

13. The router of claim 12 wherein said head parallelogram cross sections are larger than said stem parallelogram cross sections.

14. The router of claim 13 wherein said stem parallelogram cross sections and said head parallelogram cross sections have substantially parallel corresponding sides.

15. The router of claim 13 wherein said stem parallelogram cross sections have two parallel opposite sides which are coincident with two parallel opposite sides of said head cross sections.

16. The router of claim 12 wherein said head forms generally outwardly convex outer surfaces and opposite flat sides intersecting said curved outer surfaces.

17. The router of claim 16 wherein the stem forms opposite flat outer sides which merge with said head opposite flat outer sides.

18. The router of claim 17 wherein the head has a flat terminal remote from the stem.

19. In apparatus for cutting an insert groove in a longitudinally elongated moulding having a backside and mitred end, the combination comprising:
    (a) base structure and a first guide surface on the base structure to engage the back side of the moulding thereby to position the moulding directionally sidewardly,
    (b) a first stop associated with the base structure to engage and position the mitred end of the moulding, thereby to position the moulding endwise,
    (c) clamp means movable to engage the positioned moulding and retain the moulding on the base,
    (d) a first router and a rotary drive therefor, the router projecting into lapping relation with said mitred end of the moulding,
    (e) means to displace the first router relative to the base structure to engage and penetrate the mitred end of the moulding, thereby to produce said groove,
    (f) and means to relatively adjustably position the base structure and said rotary drive, thereby to relatively position the mitred end of the moulding and the router.

20. The apparatus of claim 19 in which said penetration of the router into the moulding is in a direction normal to said sidewise and endwise directions.

21. The apparatus of claim 19 including a flange on the base structure, and defining said first guide surface, said flange extending endwise generally toward the router.

22. The apparatus of claim 19 including
    (g) a second guide surface on the base structure to engage the back side of a second moulding having a mitred end to be grooved, thereby to position the second moulding directionally sidwardly,
    (h) a second stop to engage and position the mitred end of the second moulding, thereby to position the moulding endwise,
    (i) said clamp means also movable to engage the positioned second moulding and retain it on the base structure,
    (j) a second router and a rotary drive therefore, the second router projecting generally parallel to the first router and into lapping relation with the mitred end of the second moulding,
    (k) and said means to displace the first router relative to the base structure operable to also displace the second router relative to the base structure to engage and penetrate the mitred end of the second moulding, thereby to produce said groove in the second moulding.

* * * * *